United States Patent Office 2,947,036
Patented Aug. 2, 1960

2,947,036

TREATMENT OF POLYMERIC α-CHLORO-ACRYLIC ACID ESTERS

Harry D. Anspon, Easton, Pa., assignor to General Aniline & Film Corporation, New York, N.Y., a corporation of Delaware No Drawing. Filed Jan. 17, 1957, Ser. No. 634,629

13 Claims. (Cl. 18—48)

This invention relates to the treatment of polymeric esters of α-chloroacrylic acid, and relates more particularly to a process for treating sheets of polymeric esters of α-chloroacrylic acid and to the product thereof.

It is an important object of this invention to provide a novel process for treating sheets of polymeric esters of α-chloroacrylic acid whereby the treated sheets attain desirable properties.

Another object of this invention is the provision of sheets having a basis of a polymeric ester of α-chloroacrylic acid which are a beautiful white in appearance without trace of color and have other desirable characteristics.

A further object of this invention is the provision of sheets having a basis of a polymeric ester of α-chloroacrylic acid which resemble white porcelain or white marble.

Other objects and advantages of this invention will appear from the following description and claims.

Masses of polymer foam have been produced heretofore from natural polymers such as rubber, as well as synthetic elastomers and synthetic resins, such as polystyrene or polymethyl methacrylate, by inclusion in a mass of the polymer (or in an intermediate polymer composition adapted to yield the final polymer on heating) of a compound adapted to generate a gas at temperatures at which the mass is plastic, and heating the mass at gas-generating temperatures to form a plastic foam. Inclusion in the polymers of gas-generating compounds (also called "blowing agents"), while satisfactory for some purposes, is subject to a number of disadvantages. Thus, the blowing agents tend to discolor the polymer, and to lower its softening point, strength and rigidity. Many of the blowing agents heretofore employed are costly, and are inconvenient or dangerous to handle or prepare because of their instability, toxicity, or the toxicity of their intermediates.

It is known that numerous polymers and polymeric materials will generate gas spontaneously on heating at decomposition temperatures, whereby masses of foam are produced, but such procedures are generally regarded as undesirable because of deterioration of the polymer. Thus, foam-forming decomposition is usually accompanied by changes in the polymer structure, such as an increase in cross-linking of polymer chains which render the polymer brittle and insoluble in organic solvents. In some cases, depolymerization or other decomposition reaction occur, impairing the tensile strength, rigidity or firmness of the polymer.

It is also known that polymers and copolymers of esters of α-chloroacrylic acid with lower monohydroxy hydrocarbons (i.e. alcohols of 1 to 6 carbon atoms and phenol), in partly or fully polymerized state, can be converted to a polymer foam without addition of foreign gas-generating agents and without impairing the desirable properties of the polymers, by heating at a temperature within the range of 135 to 225° C. at which decomposition occurs and at which the polymer is in plastic condition. The polymer foam produced under these conditions has numerous advantageous properties. For example, the foam mass produced from colorless methyl α-chloroacrylate polymers remained colorless, odorless and tasteless after foam-forming treatment and the strength and impact-resistance of the foam mass is similar to or greater than that of the original solid polymer.

I have discovered that when polymers of an ester of α-chloroacrylic acid with lower monohydroxy hydrocarbons, such as alcohols of 1 to 6 carbon atoms and phenols, and copolymers thereof with, for example, acrylonitrile, vinylidene chloride, methyl methacrylate, styrene, methyl acrylate, vinyl isobutyl ether, allyl alcohol, vinyl chloride, methacrylamide, vinyl trichlorosilane, allyl chloride, methacrylonitrile, methacrylic acid, vinyl carbazole, acrolein, allyl glycidyl ether and methyl pentadiene, are subjected to the action of steam, i.e. water or water vapor at temperatures ranging between 250 and 260° F. and pressures in excess of atmospheric, there are produced finely foamed materials of highly desirable characteristics. In order to get satisfactory foaming in the copolymer the ester of α-chloroacrylate polymer should be present in an amount of at least 25 mole percent and preferably at least 50 mole percent. While good results are obtained by the use of any of the above polymers and copolymers, my invention will be described in connection with the use of polymeric methyl α-chloroacrylate and the copolymer of methyl α-chloroacrylate with acrylonitrile since optimum results are obtained by the use of these polymeric materials. Thus, for example, sheets of methyl α-chloroacrylate polymer which are finely foamed and thereby whitened by the treatment in accordance with the process of my invention have most interesting properties. The sheets are a beautiful white in appearance and are not the least bit colored. Although the density of the whiteness make the sheets appear opaque, they are actually translucent, transmitting much of the incident light falling upon them. The surface of the sheets may be varied from a glass smoothness to a semi-smooth surface. These sheets resemble a white porcelain or a white marble. These sheets are useable as substitutes for ground or milk glass without possessing the disadvantage of the poor shatter resistance of glass. In addition, the thermoplastic nature of the sheet permits its being curved to desired shapes, by the action of heat and pressure. Since the depth of the foaming and the whiteness of the sheet may be varied by the temperature and length of steaming, the sheets may be produced for all types of applications. Sheets which are foamed only on the surfaces possess a clear interior. Signs may be made from such sheets by cutting away the foamed outside layer in a desired pattern and cutting one edge to expose the clear core. The sheets when edge-lighted from the cut down edge transmit light through the core to the pattern which stands out against the unlighted background. A pattern can be foamed into the sheet by allowing water or water vapor to contact only the pattern surface and covering the remainder with gasketed plates or a water resistant film to prevent access of water except on the pattern area. Either one or both surfaces of a sheet may be exposed to steam treatment to obtain desired effects. Moreover, the treated sheets are flame-resistant.

The finely foamed sheets of this invention are prepared by subjecting transparent sheets of methyl α-chloroacrylate polymer or copolymer to the action of steam at a temperature of 250 to 260° F. and at a pressure above atmospheric for a time sufficient to cause whitening of the sheets by the formation therein of an appreciable amount of fine bubbles beneath the surfaces of the sheets. The time of the steam treatment may vary from about 15 minutes to 2 hours or more depending upon the thickness of the sheet and the degree of whiteness desired. The longer the treatment of the sheets with steam the greater will be the degree of whiteness produced thereon and the greater the depth of the whitened layer.

This invention will be specifically illustrated, but not limited, by the following examples.

This process may be operated on methyl α-chloroacrylate polymer sheets containing tertiary-butyl alcohol or Rhodamine B Extra Base or combinations of the two. Copolymer sheets, such as for example, methyl α-chloroacrylate and acrylonitrile copolymers may also be treated by this process when such sheets contain tertiary-butyl alcohol or Rhodamine B Extra Base (C.I. 749) or combinations of the two. Of course, white sheets are not produced when Rhodamine B Extra Base is present, but foaming occurs nevertheless.

*Example I*

Samples of transparent cast sheets of methyl α-chloroacrylate polymer from one-eighth to one-fourth of an inch in thickness were subjected to the below-specified periods of steam treatment at nineteen pounds per square inch of steam pressure in excess of atmospheric (255° C.).

| Number of steam treatment: | Time in minutes |
|---|---|
| 1 | 30 |
| 2 | 20 |
| 3 | 20 |
| 4 | 30 |
| 5 | 25 |
| 6 | 20 |
| 7 | 30 |
| 8 | 30 |
| 9 | 30 |
| 10 | 30 |
| 11 | 30 |
| 12 | 20 |
| 13 | 20 |
| 14 | 20 |
| 15 | 30 |
| 16 | 30 |
| 17 | 30 |
| 18 | 30 |
| 19 | 10 |

After the fourth sterilization period it was evident that the clear sheets were becoming whitened in appearance. The polymer sheets were measured for thickness between the polished faces before steaming and at the end of the nineteenth period of steaming.

In each case, the sheets expanded in thickness following the steam operations. Upon examination under a microscope, the sheets were found to possess small bubbles, 20 to 36 microns in diameter bubbles located near the surface, and 3 to 12 microns in diameter bubbles located beneath the surface. These sheets possessed a brilliant whitened surface and although the sheets appeared opaque due to the density of the whitened surface, they still were translucent, transmitting some light. These sheets cast a very diffuse light when lighted with an electric bulb from the back and the light was evenly spread over the whole sheet.

Grinding of the edges of the sheets disclosed that the whitening of the sheets had proceeded from the surface inward toward the center. The one-eighth of an inch sheets were almost completely whitened, but the one-fourth of an inch sheets possessed a clear core about one-eighth of an inch in thickness. From the increase in size of the polymer sheets upon steaming and from microscopic examination it was apparent that the sheets were whitened by the formation of very small bubbles which functioned to trap light.

One edge was ground off of one of the one-fourth of an inch sheets and a pattern of letters was ground into one of the adjacent flat whitened surfaces until the clear central core was reached. When this sheet was edge-lighted through the ground edge, the pattern of letters ground into the surface stood out sharply in bright light against the dimly lit background of the sheet forming an effective and dramatic sign. When colored lights were used for the edge-lighting, the letters stood out in the color of the lights employed.

A piece of whitened ⅛″ sheet was placed in a bath of silicone (DC–550) oil at 320° F. for ten minutes and then removed and examined. The thickness had increased to 0.220″ apparently by the expansion of the bubbles already present in the whitened sheet. This expanded sheet was brilliant white in color and the surface had been fused by the heating so that the sheet resembled glazed porcelain. This expanded sheet was still completely thermoplastic. Deep scratches could be made in the polymer sheet without destroying the whiteness or the glazed porcelain appearance.

A piece of whitened sheet was placed on an open roof to learn the effect of weather exposure on the sheet. This roof was located directly across the street from a factory chimney for a boiler in which soft coal was employed. The sample sheet was begrimed with coal dust and soot. It was cleaned with a mildly abrasive cleanser (Bab-O) and examined. The cleaned sample still retained its pristine whiteness and there was no evidence of any surface changes such as crazing or eroding.

After two hundred hours in a Fadeometer, a whitened sheet showed only a very slight change in appearance. The exposed portion being slightly less brilliant white in appearance.

*Example II*

The following sheet samples were heated in a steam sterilizer at 250 to 257° F. under steam pressure:

A. Sample of one-eighth of an inch thick clear cast sheet of methyl α-chloroacrylate polymer.

B. Sample of one-fourth of an inch thick clear cast sheet of methyl α-chloroacrylate polymer.

C. Sample of one-fourth of an inch thick clear cast sheet of methyl α-chloroacrylate polymer.

D. Sample of one-fourth of an inch thick clear cast sheet of methyl α-chloroacrylate polymer, coated on one side for one-third of its length with Dow-Corning high vacuum stopcock grease.

E. Sample of polystyrene cubes (about one-eighth of an inch square faces).

F. Sample of methyl methacrylate polymer (Lucite) one-half of an inch thick clear sheet.

The above samples were heated at 250 to 257° F. for fifteen minutes under steam pressure and then examined. Samples A, B, C and D were all equally white (cloudy). Sample D was the least cloudy. The Lucite was clear and the polystyrene was slightly opaque.

The samples were heated for one hour more at 255° F. under steam pressure and examined. The opaqueness of all samples had increased, but the Lucite sample was still practically clear, being only slightly cloudy.

The samples were heated for another hour at 255° F. under steam pressure and examined. They had changed very little.

The samples were heated for an additional fifteen minutes at 255° F. under steam pressure and again were examined. The methyl α-chloroacrylate polymer samples were a dense white in appearance. Sample D was the least dense in whiteness of the methyl α-chloroacrylate polymers.

The polystyrene sample possessed a dull white opaqueness. The Lucite sample was only a light cloudy white in appearance compared to the dense brilliant whiteness of the chloroacrylate polymer.

The coating of the sample with a silicone resin apparently had slowed down the penetration of water into the chloroacrylate polymer. Another sample of methyl α-chloroacrylate polymer which had been halfway immersed in Dow-Corning Type 550 silicone oil during pressure steaming was whitened at the exposed end and clear on the end immersed in said silicone oil. This behavior indicated that water was a reactant with the methyl α-chloroacrylate polymer under these conditions. The fact that the polystyrene and particularly the methyl methacrylate polymer did not undergo the same dense whitening is indicative that the reaction is probably one between water and the chlorine atom of the methyl α-chloroacrylate units. Since microscopic examination has revealed the presence of small bubbles, it is believed that the whitening is caused by the reaction of water and the polymer to form exceedingly fine bubbles in the polymer, probably containing HCl gas. These small bubbles trap light and give the whitened appearance to the polymer. Part of the whitening may be due to the simultaneous formation of —OH groups in place of —Cl groups on the polymer chain which may cause additional whitening. The bulk of the whitening, however, undoubtedly is due to the bubble formation. Although the bubbling is probably due to HCl liberation, very little HCl escapes from the polymer sheet for only very slight traces of HCl can be detected in the condensed water around a steamed sheet placed in a Petri dish.

Besides the novel effect of whitened sheets with clear cores, the fine bubbles formed in the steamed sheets act as nuclei for bubbles in further expansion of the sheet on heating at elevated temperatures. Due to the very small and uniform nature of the bubbles, an exceedingly fine and uniform expanded structure can be obtained by further heating of the steamed polymer sheets. If the heating is done in an oil bath, a glazed surface is produced on expansion. If the heating is done in an air bath or between the platens of a press, a dull non-glazed surface is formed.

Since the steamed sheets, before and after foaming, appear to be completely thermoplastic, very little if any cross-linking has occurred in the steaming process.

The flame-resistance of the steamed polymer sheets depends upon the duration of steaming; and in the foamed sheets from steamed sheets, the flame resistance also depends on the extent of the steaming as well as the extent of expansion of the foam.

*Example III*

A sheet of methyl α-chloroacrylate polymer was placed in a sterilizing oven and steamed for twenty-four hours at 250° F. and eighteen pound steam pressure (above atmospheric). This "pre-foamed" polymer sheet was then placed in a press and heated at one-half hour at 338° F. No pressure was applied and the plates were allowed to expand slowly as the polymer sheet foamed and expanded. It was found that the foamed polymer sheet had expanded in thickness to three times the actual size of the original polymer sheet which had been one-eighth of an inch in thickness before it was steamed and further treated. This expansion on a volume basis is twenty-seven times the original volume.

*Example IV*

A sheet of methyl α-chloroacrylate polymer possessing smooth polished surfaces and weighting 26.5 grams was steamed for twenty and one-half hours at 250° F. under eighteen pound per square inch gauge steam pressure. After steaming, the sheet weighed 27.8 grams which represented a gain in weight of 1.3 grams upon steaming. The thickness increased from 0.2390" to 0.2545", an increase of 0.0155". The clear polished sheet had been changed to a brilliant white translucent sheet by the steaming. The central core of the sheet was still clear and transparent.

The whitening caused by foaming is probably due to the reaction of water with the chlorine atom in the methyl α-chloroacrylate polymer, since methyl methacrylate polymer (Lucite) and polystyrene exhibit very little whitening when steamed. The water treatment probably forms:

(1) 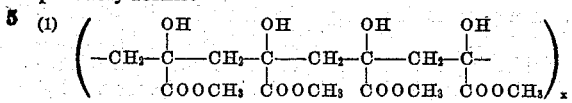

which probably goes to (2) 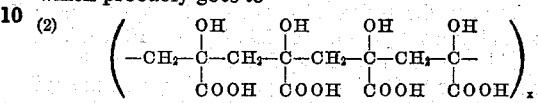

and on further steaming may eventually cyclize to (3) 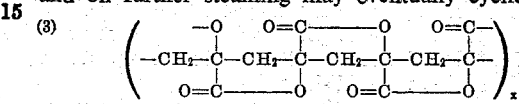

It is to be understood that the foregoing detailed description is given merely by way of illustration and that many variations may be made therein without departing from the spirit of my invention.

Having described my invention what I desire to secure by Letters Patent is:

1. In a process for the production of whitened polymeric material, the step which comprises subjecting a polymeric material, selected from the group consisting of polymeric esters of α-chloroacrylic acid and copolymers containing said esters, to the action of steam at superatmospheric pressure and at a temperature of 250 to 260° F. whereby small bubbles are formed in said polymeric material.

2. In a process for the production of whitened polymeric material, the step which comprises subjecting a polymeric material, selected from the group consisting of polymeric esters of α-chloroacrylic acid and copolymers containing a major proportion of said esters, to the action of steam at superatmospheric pressure and at a temperature of 250 to 260° F. whereby small bubbles are formed in said polymeric material.

3. In a process for the production of whitened polymeric material, the step which comprises subjecting transparent sheets having a basis of a polymeric material, selected from the group consisting of polymeric esters of α-chloroacrylic acid and copolymers containing said esters, to the action of steam at superatmospheric pressure and at a temperature of 250 to 260° F. whereby small bubbles are formed at least on the surfaces of said sheet of polymeric material.

4. In a process for the production of whitened polymeric material, the step which comprises subjecting transparent sheets having a basis of a polymeric material, selected from the group consisting of polymeric esters of α-chloroacrylic acid and copolymers containing a major proportion of said esters, to the action of steam at superatmospheric pressure and at a temperature of 250 to 260° F. whereby small bubbles are formed at least on the surfaces of said sheet of polymeric material.

5. In a process for the production of whitened polymeric material, the step which comprises subjecting a material having a basis of methyl α-chloroacrylate polymer to the action of steam at superatmospheric pressure and at a temperature of 250 to 260° F. whereby small bubbles are formed in said material.

6. In a process for the production of whitened polymeric material, the step which comprises subjecting a material having a basis of a copolymer of methyl α-chloroacrylate and acrylonitrile to the action of steam at superatmospheric pressure and at a temperature of 250 to 260° F. whereby small bubbles are formed in said material.

7. In a process for the production of whitened polymeric material, the step which comprises subjecting a material having a basis of a copolymer of methyl α-chloroacrylate and acrylonitrile, in which copolymer methyl α-chloroacrylate is present in an amount of at least 25 mole percent, to the action of steam at superatmospheric pressure and at a temperature of 250 to 260° F. whereby small bubbles are formed in said material.

8. In a process for the production of whitened polymeric material, the step which comprises subjecting a material having a basis of a copolymer of methyl α-chloroacrylate and acrylonitrile, in which copolymer methyl α-chloroacrylate is present in an amount of at least 50 mole percent, to the action of steam at superatmospheric pressure and at a temperature of 250 to 260° F. whereby small bubbles are formed in said material.

9. Process for whitening transparent sheets of methyl α-chloroacrylate, which comprises subjecting a transparent sheet of methyl α-chloroacrylate to the action of steam at superatmospheric pressure at a temperature of 250 to 260° F. whereby small bubbles are formed at least on the surfaces of said sheet.

10. Process for whitening thermoplastic sheets of methyl α-chloroacrylate, which comprises subjecting a transparent to translucent sheet of methyl α-chloroacrylate containing tertiary butyl alcohol to the action of steam at superatmospheric pressure at a temperature of 250 to 260° F. whereby small bubbles are formed at least on the surfaces of said sheet.

11. Process for whitening thermoplastic sheets of methyl α-chloroacrylate, which comprises subjecting a transparent sheet of methyl α-chloroacrylate containing Rhodamine B Extra Base to the action of steam at superatmospheric pressure at a temperature of 250 to 260° F. whereby small bubbles are formed at least on the surfaces of said sheet.

12. Process for whitening transparent sheets of methyl α-chloroacrylate, which comprises subjecting a transparent to translucent sheet of methyl α-chloroacrylate containing at least one of the compounds selected from the group consisting of tertiary butyl alcohol and Rhodamine B Extra Base, to the action of steam at superatmospheric pressure at a temperature of 250 to 260° F. whereby small bubbles are formed at least on the surfaces of said sheet.

13. Process for preparing glazed whitened sheets of methyl α-chloroacrylate, which comprises subjecting a transparent sheet of methyl α-chloroacrylate to the action of steam at superatmospheric pressure and at a temperature of 250 to 260° F., and then heating the whitened sheet produced in a bath of oil, selected from the group consisting of mineral oil and silicone oil, at a temperature of 320° F. whereby small bubbles are formed at least on the surfaces of said sheet whitening the same and glazing the surfaces of the sheet.

References Cited in the file of this patent
UNITED STATES PATENTS

| | | |
|---|---|---|
| 2,157,049 | Bartoe | May 2, 1939 |
| 2,352,725 | Markwood | July 4, 1944 |
| 2,314,975 | Ford | July 4, 1944 |
| 2,528,200 | Weinberg | Oct. 31, 1950 |
| 2,684,341 | Anspon et al. | July 20, 1954 |
| 2,767,434 | Fortune | Oct. 23, 1956 |